A. E. KENNEY.
CURTAINLESS SHOWER BATH.
APPLICATION FILED DEC. 29, 1914.
Reissued Feb. 9, 1915.
13,877.
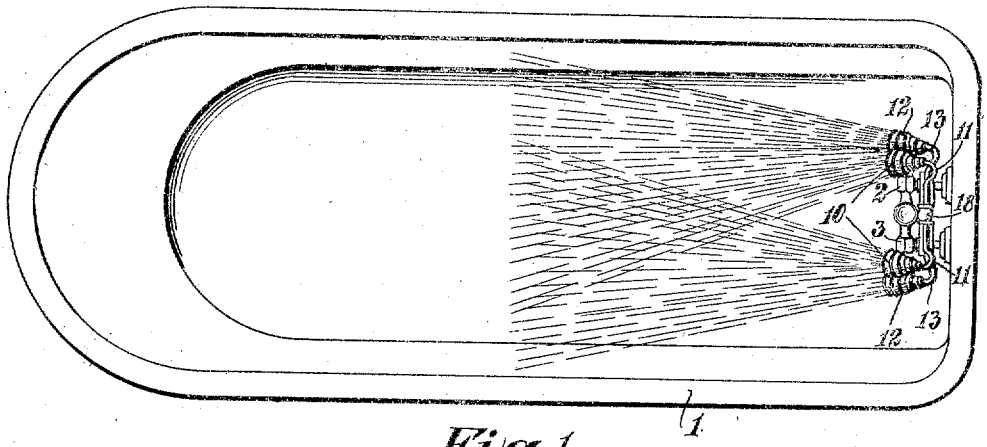
Fig. 1
Fig. 3.
Fig. 2.
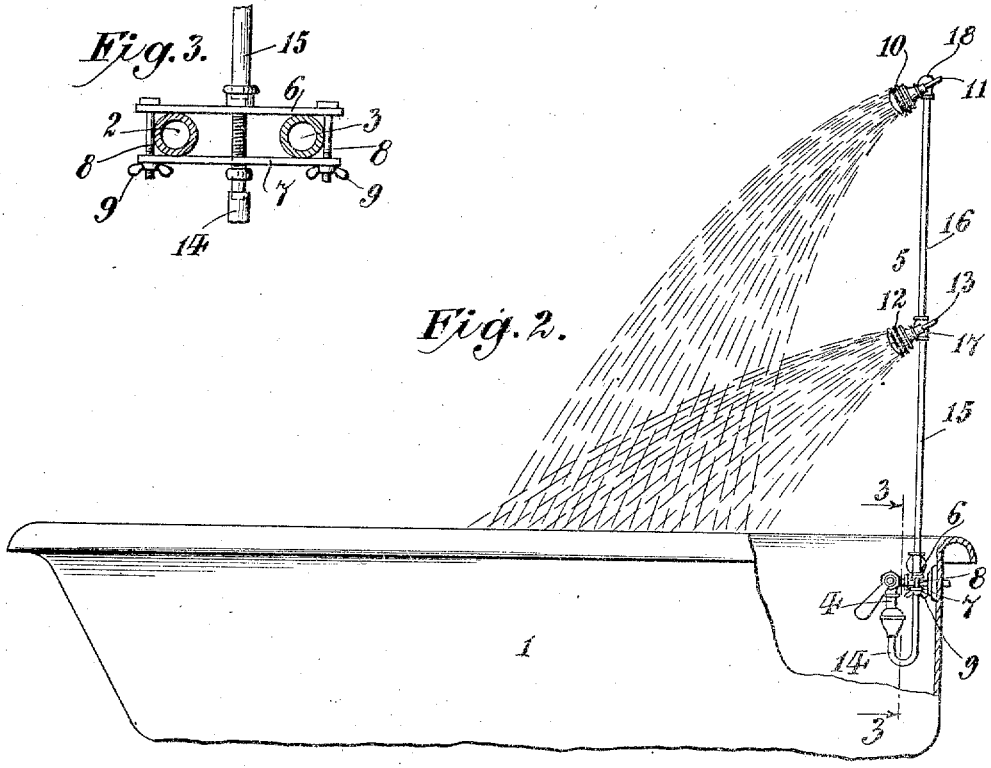
WITNESSES
Geo. Shrader
M. E. Morehon
INVENTOR
Andrew E. Kenney
BY
Marion & Austin
ATTORNEYS

UNITED STATES PATENT OFFICE.

ANDREW E. KENNEY, OF NORTH PLAINFIELD, NEW JERSEY, ASSIGNOR, BY MESNE ASSIGNMENTS, TO WATERBURY MANUFACTURING COMPANY, A CORPORATION OF CONNECTICUT.

CURTAINLESS SHOWER-BATH.

13,877. Specification of Reissued Letters Patent. Reissued Feb. 9, 1915.

Original No. 1,054,922, dated March 4, 1913, Serial No. 682,771. Application for reissue filed December 29, 1914. Serial No. 879,601.

REISSUED

*To all whom it may concern:*

Be it known that I, ANDREW E. KENNEY, a citizen of the United States, and a resident of North Plainfield, in the county of Somerset and State of New Jersey, have invented certain new and useful Improvements in Curtainless Shower-Baths, of which the following is a specification.

The present invention relates generally to shower baths, and has more particularly reference to means whereby an ordinary bath tub can be converted into a shower bath without necessitating the use of a curtain to prevent splashing of the water outside the tub.

Heretofore it has been customary to conduct the water to a sprinkler head above the tub and to discharge the spray downwardly in a substantially vertical direction inside a curtain.

The object of my invention is to provide shower means whereby the unsightly and unsanitary curtain may be eliminated, and which may be readily attached to or detached from the fixtures of standard bath tubs, or which may remain in position, at least partially, without disfiguring the appearance of the tub.

I have found that by directing two evenly balanced streams from shower heads provided with a plurality of fine openings having their axes arranged on converging lines so that the streams will be directed toward each other in a general horizontal and somewhat downwardly inclined direction from a point in a plane above the walls of the tub but without entirely crossing the tub laterally or extending longitudinally beyond the end of the tub, all of the water will fall wholly within the confines of the tub without splashing outside thereof even when the shower is in use.

Accordingly the invention consists, broadly, in means for directing two or more streams of water in the above described manner.

In the particular form herein disclosed, two shower heads are arranged on opposite sides of the median line of the tub, at one end thereof and above the plane of the walls of the tub, and so disposed as to direct the streams in an inwardly and somewhat downwardly inclined direction.

Other features will appear as the specification proceeds.

In the accompanying drawings the invention is disclosed in a concrete and preferred form.

Changes may of course be made without departing from the legitimate and intended scope of the invention as expressed in the accompanying claims.

In the drawings: Figure 1 is a plan view of the invention in its preferred embodiment, showing it in actual use in an ordinary tub. Fig. 2 is a side elevation of the same with the walls of the tub broken away to show a preferred method of attaching the device to the tub. Fig. 3 is an enlarged detail view on the line 3—3 of Fig. 2.

Like reference characters refer to corresponding parts in the several views.

1 indicates a tub of the usual construction preferably of a greater length than width, provided at one end with a cold water faucet 2 and a hot water faucet 3, together with an inlet spigot 4 common to both in a well known manner. For the sake of convenience, it will be understood that the water supply will be obtained from the faucets of the tub, but it is equally clear that the supply of water may be obtained from any other source that may be available.

5 is a hollow upright column, in the present instance carried by a supporting bar 6 which rests upon the two faucets 2 and 3 and bridges the space therebetween.

7 is a clamping bar adapted to engage underneath the faucets 2 and 3 and to support the upright column 5 properly in position. Suitable means for clamping the bars 6 and 7 to the faucets may take the form of the bolts 8 and nuts 9.

10 indicates two nozzles disposed in a plane above the walls of the tub and located at one end of the tub and at opposite sides of the median line of the longitudinal axis thereof, as shown in the drawings. These two nozzles 10 are disposed so as to direct the streams of water in a general horizontal direction on slightly converging lines and on somewhat downwardly inclined lines. In the disclosure here made these two nozzles take the form of shower heads, as shown, which are disposed at an angle toward each other, and in the present instance these shower heads are also inclined somewhat in a downward direction. The two shower heads are of greater cross-sectional area than the supply pipes 11 leading thereto and are perforated in the usual manner. The supply pipes 11 are in communication with the column 5. In the specific form here disclosed it is preferred to have two sets of these shower heads in different horizontal planes, and in the drawings are illustrated a second set of shower heads 12 which connect by means of the supply pipes 13 to the column 5. The column 5 is in communication with a source of water supply here taking the form of the ordinary inlet spigot 4 of the tub by means of the flexible connection 14. In order to separate the parts easily, the column 5 is composed of two pipe sections 15 and 16 secured together by means of the coupling 17 which carries the lateral supply pipes 13. At the top of the pipe section 16 there is another coupling 18 which connects the said pipe section 16 with the supply pipes 11. The pipe sections 15 and 16 are threaded exteriorly so as to engage in interior threads in the coupling 17, and the pipe section 16 is further threaded so as to engage with interior threads in the coupling 18. In this manner the attachment may be readily dismantled. If desired, the pipe section 15 may likewise be in threaded engagement with the clamping bar 6.

It will be understood that when the water is turned on, two evenly balanced streams will issue from the nozzles 10. These streams of water are projected in a general horizontal direction on converging lines and in a somewhat inclined direction at a point above the walls of the tub so that both will fall wholly within the tub when the water is flowing but the shower is not in use and will not produce any splash outside of the tub when the shower is in use. The same effect is produced by the lower streams issuing from the nozzles 12. In the illustrations the streams are shown as they would appear at low pressure or when the water is turned on only partially, but it will be understood that with higher pressure and with the water turned on as fully as required, the same principle of operation will hold true and the streams will, on account of the particular disposition of the nozzles, fall wholly within the tub.

Another feature of the invention which is of considerable importance is in placing the nozzles of the upper pair (in the case in which two or more sets or pairs of nozzles are employed) offset from the vertical plane of the lower pair or pairs so that any dripping from the upper nozzles will not strike upon the lower nozzles. In the present embodiment the upper nozzles are offset from the lower nozzles by spacing them closer together, as will be seen in the plan view. But it will be understood that the same object may be attained by extending them farther out into the body of the tub, or in other ways offsetting the upper nozzles from the vertical plane of the lower nozzles.

The precise angles at which the nozzles are set may vary to suit different conditions, such as the different sizes and styles of tubs, different water pressures, etc. It may be stated as a general rule, however, that the angle of downward slant will be between the horizontal and a line sixty degrees from the horizontal, and the inward inclination or angle of convergence will be between a line parallel to the longitudinal median line of the tub and a line extending at forty-five degrees to such parallel line.

In the use of the ordinary overhead shower the water will not usually fall or splash outside of the tub when the water is flowing without the bather being in position but when the bather is under the shower a considerable amount of water splashes off the body onto the floor and walls of the room and therefore it is customary in practice to provide a depending curtain to surround the bather while the bath is being taken. These curtains are unsanitary and interfere with the use of the tub for non-shower bathing purposes and are otherwise objectionable from the point of view of expense as well as use.

By the arrangement of the streams in accordance with my invention, I am able to dispense with the curtain entirely because the water will not fall outside of the tub either when the bath is being taken or when the water is flowing freely into the tub.

What is claimed, is:

1. In a shower bath, the combination with a tub, of a pair of nozzles located in substantially the same horizontal plane and at a point above the rim of the tub, a second pair of nozzles located above the first pair in substantially the same horizontal plane, each pair of nozzles disposed to direct their streams on converging and downwardly inclined lines whereby the streams from all the nozzles will fall within the confines of the tub, and means for supplying water to the nozzles.

2. In a shower bath, the combination with a tub having hot and cold water faucets, a supporting bar resting upon and bridging the space between the two faucets, a clamping bar engaging beneath the two faucets, means for forcing the two bars together to clamp them upon the faucets, a hollow upright column rising from the supporting bar, laterally extending arms carried by the column, nozzles carried by said arms disposed to direct their streams on converging and downwardly inclined lines so that the streams shall fall within the confines of the tub, and a water supply connection between the faucets and the upright column.

3. In a shower bath, the combination with a tub, of a pair of nozzles arranged in spaced relation and disposed to direct their streams on converging lines downwardly inclined into the tub so that such streams shall fall wholly within the confines of the tub, a second pair of nozzles located above the first pair and disposed to direct their streams on converging and downwardly inclined lines so as to fall wholly within the confines of the tub, the second pair of nozzles being also disposed in spaced relation but offset from the vertical plane of the lower pair to prevent drippings from the upper pair of nozzles from falling on the lower pair of nozzles and being splashed by such contact.

4. In a shower bath, the combination with a bath tub provided with a hot and cold water supply at one end thereof, of a shower comprising an upright pipe detachably connected to said water supply, groups of relatively small outlets at about the same level on either side of said pipe and in communication therewith, each of said groups of outlets being in a plane approximating to the vertical but with the plane of the group on one side of the pipe meeting the plane of the group on the other side of the pipe at an obtuse angle so that the streams of water from said groups of outlets will be directed lengthwise of the tub but will converge within the limits of the tub.

5. In a shower bath, the combination with a tub provided with a faucet, of a portable shower detachably secured to the faucet and supported thereby comprising an upright pipe provided with a plurality of fine outlets, said outlets being arranged in groups in an approximately horizontal plane to discharge a plurality of fine streams directed at an angle to each other whereby the streams will converge above the level of the tub and approximately above the median line thereof to form substantially a single large stream and fall wholly within the tub, and means for supplying water to said pipe and outlets.

6. In a shower bath, the combination with a faucet, of an upright pipe communicating with said faucet and provided with a plurality of relatively small outlets above the level of the tub, said outlets being arranged in groups to deliver approximately equal quantities of water in relatively distinct streams, the axis of each group being arranged to intersect the vertical plane coincident with the median line of the tub and intermediate the ends thereof so that the streams of water delivered from each group of outlets will commingle above the tub to form substantially a single stream and the water will fall wholly within the confines of the tub, and means for supplying water to said faucet.

Signed at New York city, in the county of New York and State of New York this 19th day of Nov. A. D. 1914.

ANDREW E. KENNEY.

Witnesses:

GRAEFF MILLER,

MARGARET KELLEY.